C. S. MacKEARNIN.
DOOR OPERATING DEVICE.
APPLICATION FILED JAN. 17, 1913.
1,111,801.
Patented Sept. 29, 1914.
2 SHEETS—SHEET 1.
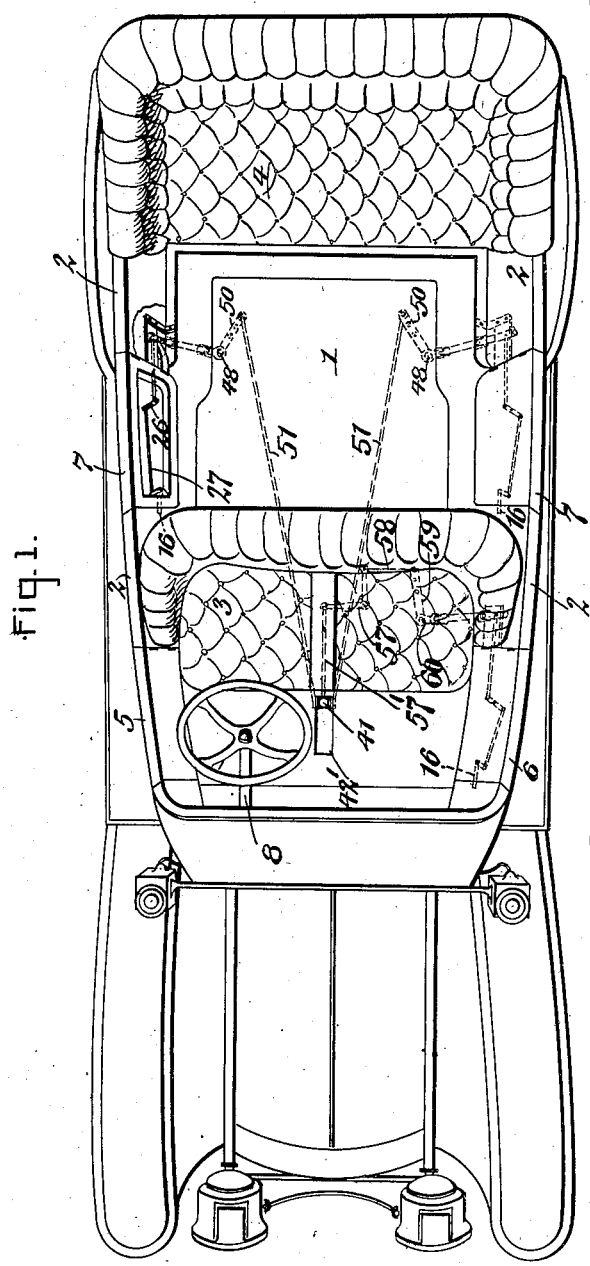
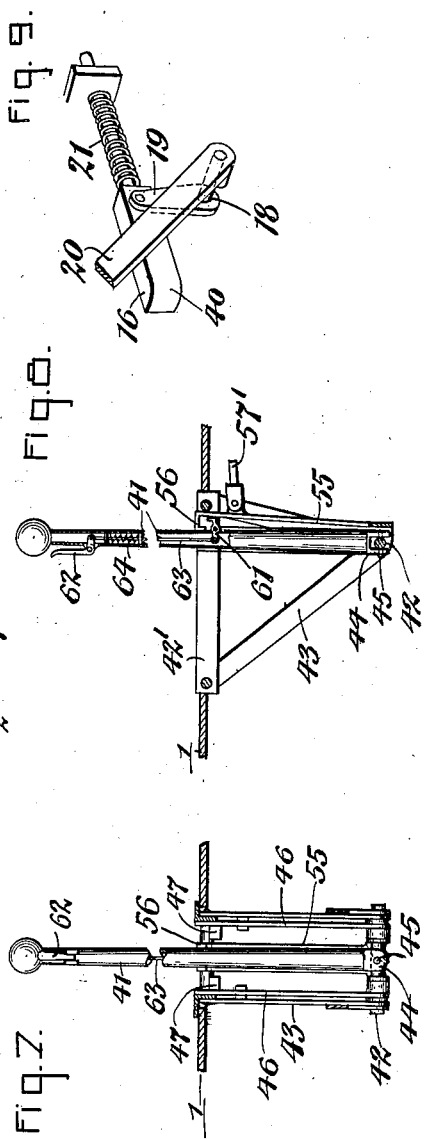
WITNESSES
W. Ray Taylor
Walter P. Geyer.
INVENTOR
Charles S. MacKearnin
by Geyer & ToBB
ATTORNEYS

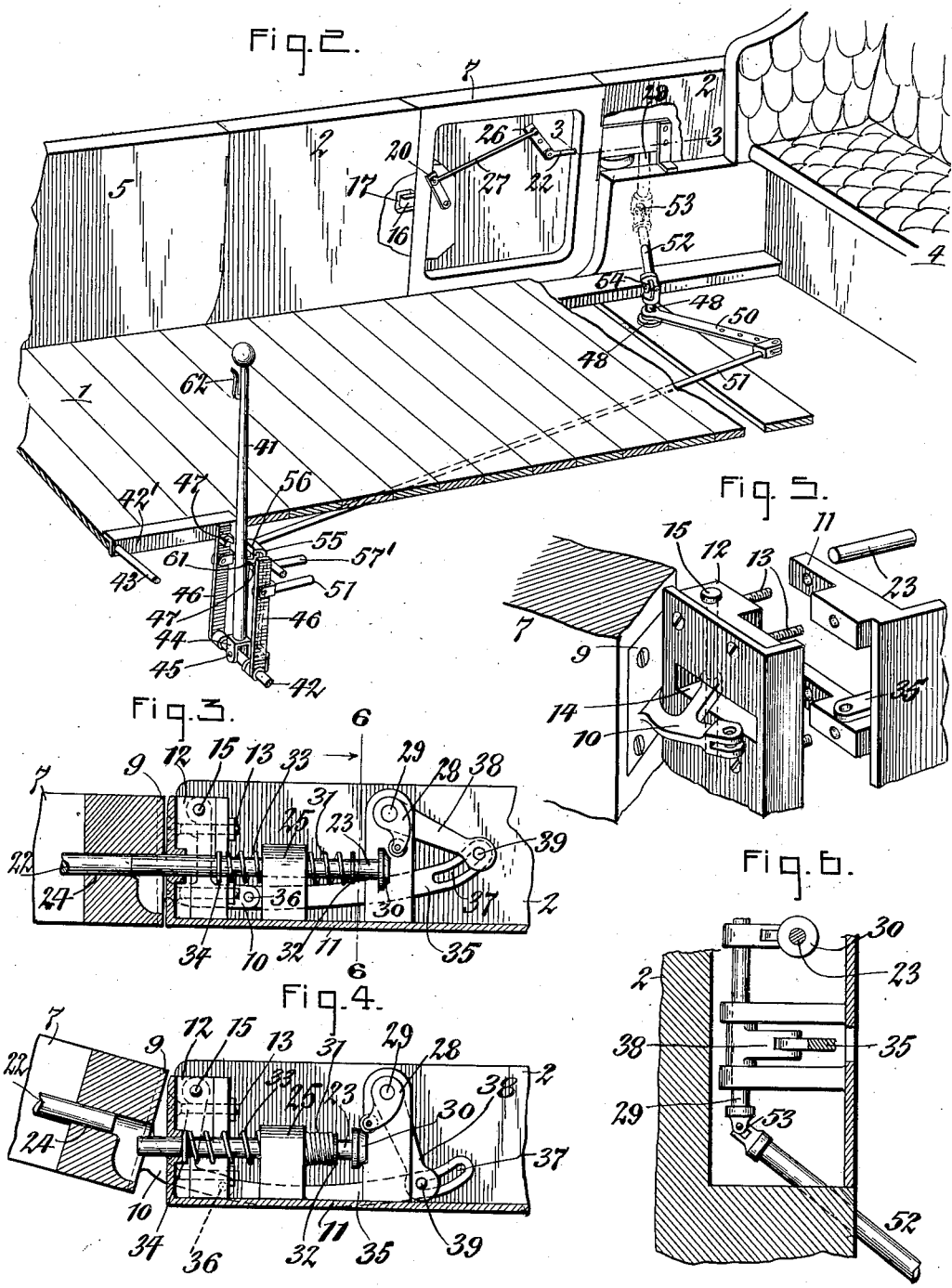

UNITED STATES PATENT OFFICE.

CHARLES S. MacKEARNIN, OF BUFFALO, NEW YORK.

DOOR-OPERATING DEVICE.

1,111,801.  Specification of Letters Patent.  Patented Sept. 29, 1914.

Application filed January 17, 1913. Serial No. 742,541.

*To all whom it may concern:*

Be it known that I, CHARLES S. MACKEARNIN, a citizen of the United States, residing at Buffalo, in the county of Erie and State of New York, have invented new and useful Improvements in Door-Operating Devices, of which the following is a specification.

This invention relates to a door operating device which is more particularly designed for use on automobiles although the same may also be used elsewhere.

As is well known the opening and closing of the doors of an automobile by the passengers is attended with some difficulty and inconvenience.

It is the object of this invention to provide simple efficient and comparatively inexpensive means whereby various doors of an automobile or the like are placed under the control of the chauffeur so that they may be opened and closed by the latter whenever required, thereby relieving the passengers of this work and also enabling the chauffeur to control the exit of the passengers from the automobile so as to prevent accidents.

In the accompanying drawings consisting of two sheets: Figure 1 is a top plan view of an automobile provided with my improved door operating device. Fig. 2 is a fragmentary perspective view of the same. Fig. 3 is a fragmentary horizontal section, on an enlarged scale, taken in line 3—3, Fig. 2, and showing those portions of the door operating device adjacent to the pivotal connection between one of the doors and a side wall of the automobile body. Fig. 4 is a similar view of the same parts in a different position from that indicated in Fig. 3. Fig. 5 is a detached perspective view of some of the parts of my improved door operating device adjacent to the hinge of the door. Fig. 6 is a fragmentary vertical transverse section taken in line 6—6, Fig. 3. Fig. 7 is a fragmentary vertical transverse section, on an enlarged scale, of the hand lever and adjacent parts of the door operating mechanism. Fig. 8 is a vertical longitudinal section of the same. Fig. 9 is a fragmentary perspective view showing one of the latches or locks whereby the doors are held in a closed position.

Similar characters of reference indicate corresponding parts throughout the several views.

Although my invention is applicable to automobiles and other vehicles which may vary widely in construction the same is shown in the drawings applied to an automobile having a body which comprises a bottom 1, two longitudinal side walls 2, a front seat 3, a rear seat 4, two front doors 5, 6 controlling openings or passageways in the side walls in front of the front seat, and two rear doors 7, 7 controlling passageways or openings in the side walls between the front and rear seats. In the automobile shown in Fig. 1 the steering post 8 forming part of the mechanism for controlling the automobile is arranged on the right hand side in which case the chauffeur occupies the right hand end of the front seat while the left end of this seat and the two rear seats are occupied by passengers. The right hand front door 5 is therefore mounted in the ordinary way inasmuch as the same is within convenient reach of the chauffeur who can readily manipulate the same for entering or leaving the auto through the passageway of this door. The left hand front door 6 and the left and right hand rear doors 7, 7 being remote from the chauffeur's seat are operated by mechanism under the control of the chauffeur for opening and closing these last mentioned doors. The left front door and each of the rear doors is preferably pivotally mounted at its rear edge on the adjacent rear edge of the respective door opening or passageway of the body by means of a hinge comprising a movable leaf 9 secured vertically to the rear edge of the door and provided with an elbow shaped arm 10 projecting rearwardly therefrom, a casing or frame having a rear section 11 which is permanently secured to the adjacent part of the side wall, and a front section 12 which is detachably connected with the rear section 11 by means of screws 13, as shown or otherwise, and provided with a horizontal transverse slot 14 which receives the hinge arm 10 of the door, and a vertical pintle 15 which pivotally connects the rear end of the hinge arm with the front section of the casing adjacent to the outer side of the same.

The lock of each door may be variously constructed, but that shown in the drawings, for example, comprises a horizontally sliding locking bolt or catch 16 guided in a suitable way on the free front edge portion of the door and adapted to engage with a socket or recess 17 in the adjacent side wall, a short horizontal rock shaft 18 journaled transversely on the door and provided at one end with an upright rock arm 19 which connects with the inner end of the locking bolt or catch 16, an upright operating arm 20 arranged at the other end of the shaft 18, and a spring 21 whereby the locking bolt is yieldingly held in its projected or operative position and in engagement with the socket 17 of the body.

The mechanism whereby the locking bolt of each door 6, 7, 7 is retracted preparatory to swinging the respective door into its open position comprises a horizontal sectional shifting rod, the sections 22, 23 of which are arranged horizontally in line in the normal or closed position of the door and the front section 22 of which is guided in a horizontal longitudinal way 24 formed on the door adjacent to its hinged edge while the rear section 23 is guided in a way 25 formed on the inner side of the casing adjacent to the hinge of the respective door. These two shifting rod sections are adapted to abut within the joint between the door and the adjacent wall of the body during the operation of unlocking the door, but as the door is swung open the front shifting rod section moves away from the rear shifting rod section. The movement of the shifting rod sections is transmitted to the locking bolt by means of an intermediate rock lever 26 pivoted on the door and having its lower arm connected with the front end of the front shifting rod section 22 while its upper arm is connected by means of a link 27 with the operating arm 20 on the rock shaft 18 of the rock.

The forward movement of the shifting rod sections for opening the locking bolt is effected by a horizontally swinging lock releasing arm 28 which is mounted on the upper end of a short vertical rock shaft 29 journaled in bearings on the rear part of the hinge frame. During its forward movement this rock arm 28 engages with a bearing head or enlargement 30 on the rear end of the rear shifting rod section 23 and thereby pushes this section forward together with the front section which at this time abuts against the rear section, this movement being transmitted by the intermediate mechanism to the locking bolt for retracting the same from the socket of the body. For purposes which will presently appear the releasing rock arm 28 upon engaging the head 30 and moving the same forwardly sufficiently to unlock the door continues to move in this direction until it clears said head and thereby permits a spring 31 to return the rear shifting rod section into its retracted position and also to permit the spring 21 to project the locking bolt and move the front shifting rod section into its rearmost position. The spring 31 surrounds the rear part of the rear rod section and bears at its front end against the guideway 25 and at its rear end against a collar 32 on this rod section, as shown in Fig. 3. In order to permit the releasing arm to again swing rearwardly past the bearing head 30 and into its rearmost position a supplemental or auxiliary spring 33 is provided which is arranged around the front part of the rear rod section between the guideway 25 and a collar 34 on this rod section. It follows from this construction that when the releasing arm 28 swings rearwardly and engages with the bearing head the latter together with the rear rod section are capable of yielding and moving rearwardly under the action of the releasing arm until this arm clears the bearing head after which the auxiliary spring 33 again moves the rear rod section forwardly into its central normal position indicated in Fig. 3.

The rocking motion of the shaft 29 is so determined that the first part of its forward movement operates to unlock the door by engagement of the releasing arm with the bearing head while the last part of this movement is independent of the door unlocking device and operates to positively open the door, while the return movement of this shaft operates to again positively close the door.

The mechanism whereby the shaft 29 operates to positively open and close the door is constructed as follows: 35 represents a horizontal shifting link which is arranged lengthwise within the casing or frame 11, 12 and pivotally connected at its front end by means of a vertical pin 36 with the elbow of the hinge arm 10 while its rear end is provided with a longitudinal slot 37 which is preferably curved as shown. 38 represents a horizontally movable door swinging rock arm secured to the central part of the rock shaft 29 and provided with an upright pin 39 which engages with the slot 37 at the rear end of the shifting link. In the closed position of the door the pin of the door swinging arm 38 is arranged at the rear end of the slot 37, as shown in Fig. 3, and the releasing arm 28 is arranged immediately in rear of the bearing head, as shown in Fig. 3. During the first part of the forward movement of the rock shaft 29 the releasing arm by engaging with the bearing head operates to unlock the door but the swing arm 38 at this time moves idly from the rear end to the front end of the slot 37 in the shifting link 35. Immediately after the door has been unlocked and before the releasing arm clears the bearing head during its forward movement the pin 39 of the swing arm by engaging with the front end of the slot in the shifting link causes the latter to be pushed forwardly and thereby positively open the door owing to the connection of the latter with the shifting link. The position of the parts during the first portion of the opening movement of the door is indicated in Fig. 4 at which time the lock is still in its retracted or open position. After effecting the initial portion of the opening movement of the door, the rock shaft 29 continues its forward movement whereby the swing arm 38 completes the opening of the door while the releasing arm 28 strips forwardly past the bearing head and permits the rear shifting rod section to move backwardly into its central or normal position. During the first part of the subsequent backward movement of the rock shaft 29 for closing the door the pin 39 of the swing arm 38 moves idly from the front end of this slot 37 to the rear end thereof but during the remaining portion of the backward movement of this arm the same exerts a positive pull on this link and causes the door to be swung inwardly into its closed position. During this return movement of the rock shaft 29 the releasing arm trips past the bearing head of the read rod section so as to stand in rear of the same in the manner heretofore described preparatory to again opening the lock during the next forward movement of the operating rock shaft 29. Although the locking bolt under the action of its spring 21 is again projected while the door is swung open this bolt is retracted during the closing movement of the door by engagement of the bevel face 40 on this bolt with the edge of the door opening and then springs into the locking recess 17 the instant the locking bolt is moved into line therewith, thereby holding the door in its closed position in a manner common to this type of lock or door fastener.

By constructing the casing or frame of the hinge in two sections 11, 12 the front one of which carries the pintle of the door hinge it is possible to detach the door from the vehicle body and from the operating mechanism by simply removing the screws 13 which connect the inner and outer sections 11, 12 and removing the pivot pin 39 which connects the hinge arm 10 with the shifting link 35, thereby rendering it possible to repair the door conveniently in case of injury to the same.

The mechanism whereby the left and right hand rear doors may be controlled or operated from the chauffeur's seat is preferably constructed as follows: 41 represents an upright operating lever which projects through a longitudinal slot $42^1$ formed in the bottom of the body and which is so mounted at its lower end so that its upper end can be swung forwardly and backwardly and also laterally. The preferred means for thus mounting the operating lever which are shown in the drawings comprise a horizontal rock shaft 42 journaled transversely in a hanger 43 depending from the underside of the body and a fork 44 arranged at the lower end of the operating lever so as to straddle the rock shaft 42 and connected by a horizontal longitudinal pivot pin 45 with this rock shaft. On opposite sides of the operating lever are arranged two side coupling arms or levers 46 each of which is pivoted at its lower end on the rock shaft 42 while its upper end is provided with a fork-shaped socket 47 which is adapted to be engaged by the operating lever upon swinging the same laterally toward one side of its central or neutral position. Each of the side coupling levers is operatively connected with one of the operating rock shafts 29 by means which preferably comprise an upright intermediate shaft 48 journaled in a vertical bearing 49 on the bottom of the body adjacent to the hinge of one of the rear doors, an inwardly projecting horizontal rock arm 50 secured to the intermediate rock shaft and connected by a longitudinal rod 51 with the respective coupling lever, and an intermediate swivel shaft 52 connected at its upper and lower ends by universal joints 53, 54 with the lower end of the respective operating shaft 29 and the upper end of the companion intermediate shaft 48. Upon swinging the operating lever 41 laterally in one direction or the other into engagement with the socket of one of the coupling levers the operating lever is connected with this coupling lever. Upon now moving the operating lever forwardly the respective coupling lever is compelled to move with the operating lever which movement is transmitted by the intermediate mechanism just described to the operating shaft 29 so that the respective rear door is first unlocked and then swung open. Upon moving the operating lever backwardly together with the coupling lever the respective door is again swung shut and locked in its closed position. It will be noted that by engaging the operating lever 41 with either one of the coupling levers and operating the same in the manner described either of the rear doors of the automobile may be unlocked and swung into its opened and closed position.

In order to enable the operating lever to be also utilized for unlocking and opening and closing the left front door means are provided which are constructed as follows: 55 represents a central or intermediate coupling lever arranged vertically in rear of the operating lever and pivotally mounted at its lower end on the rock shaft 42 while its upper end is provided with a downwardly projecting hook or shoulder 56. 57 represents an intermediate elbow lever pivoted on the upper side of the carriage body and having one of its arms connected by a link $57^1$ with the intermediate coupling lever 55 while its other arm is connected by means of a link 58 with a rock arm 59 on the lower end of an intermediate rock shaft 60 which is associated with the left front door. The rock shaft 60 corresponds to the rock shafts 48 associated with the operating mechanism of the rear doors and the means for transmitting motion from the rock shaft 60 to the left front door is the same as that employed for the rear doors. 61 represents a latch pivoted on the central part of the operating lever so as to swing in a vertical plane and provided on its rear arm with an upwardly projecting hook which is normally below the hook or shoulder 56 of the intermediate coupling lever. At its upper end the operating lever has pivoted thereto an elbow-shaped lever 62 the upper arm of which forms a handle while its inner or rear arm is connected by means of an upright rod 63 with the front arm of the latch 61. The rod 63 is preferably arranged within the operating lever which is made hollow for this purpose and the same is normally held yieldingly in an elevated position by means of a spring 64 so that the latch 61 is out of engagement from the hook of the central coupling lever. When it is desired to open the left front door and to close the same the hand lever 62 is pressed in the proper direction while the operating lever is in its central position so that the latch 61 engages with the hook 56 of the central coupling lever after which a forward movement of the operating lever causes the central coupling lever to move forwardly and backwardly with the same, whereby the left front door, through the medium of the intermediate mechanism, is unlocked and opened and closed in substantially the same manner as the rear doors. Upon releasing the grip of the hand on the hand lever 62 the spring 64 again disengages the latch 61 from the intermediate coupling lever leaving the operating lever free to be engaged or coupled with whichever coupling lever corresponds to the door to be operated.

It will be noted that by means of this operating mechanism any one of the doors of the automobile ordinarily used by passengers can be conveniently and promptly manipulated by the chauffeur where the latter not only controls the exit and entrance of the passengers so as to avoid accidents but the passengers are also relieved of the annoyance of opening and closing the doors themselves.

I claim as my invention:

1. A door operating device comprising a hinge which pivotally connects one edge of the door with its wall, a locking device adapted to connect the other edge of the door with said wall, and means for operating said locking device comprising a sectional shifting rod which is normally arranged in line and adapted to abut, and the front section of which is mounted to slide on the door and is connected with said locking device and the other rear section of which is mounted to slide on said wall, and means for reciprocating said shifting rod comprising a spring device which operates to yieldingly hold said rear rod section in its central normal position, a bearing head arranged on the rear end of the rear rod section, a rock shaft, and a shifting arm arranged on said rock shaft and adapted to engage with said head during its forward and backward strokes.

2. A door operating device comprising a hinge which pivotally connects one edge of the door with its wall, a locking device adapted to connect the other edge of the door with said wall, and means for operating said locking device comprising a sectional shifting rod which is normally arranged in line and adapted to abut, and the front section of which is mounted to slide on the door and is connected with said locking device and the other rear section of which is mounted to slide on said wall, a rock shaft, a rock arm arranged on said shaft and engaging said rear rod section, a link connected with said door and provided with a slot, and a rock arm arranged on said shaft and provided with a pin engaging with said slot.

3. A door operating device comprising a hinge which pivotally connects one edge of the door with its wall, a locking device adapted to connect the other edge of the door with said wall, and means for operating said locking device comprising a sectional shifting rod which is normally arranged in line and adapted to abut, and the front section of which is mounted to slide on the door and is connected with said locking device and the other rear section of which is mounted to slide on said wall, a rock shaft, a rock arm arranged on said shaft and engaging said rear rod section, a link connected with said door and provided with a slot, and a rock arm arranged on said shaft and provided with a pin engaging with said slot, said hinge having a frame which is mounted on said wall and comprising a fixed rear section upon which said shaft is mounted, and a detachable front part which carries the pintle of the hinge.

4. A door operating device comprising a plurality of coupling levers each of which is operatively connected with a door and provided with a socket, and an operating lever arranged between said coupling lever and capable of engaging the socket of either of said coupling levers by swinging the operating lever laterally and also capable of swinging forwardly and backwardly with the coupling levers while in engagement with one or the other.

5. A door operating device comprising a plurality of coupling levers each of which is operatively connected with a door, one of said coupling levers having a laterally opening socket and the other with a shoulder or hook, an operating lever capable of swinging forward and backward with said coupling levers and also laterally into engagement with said socket, and a latch mounted on the operating lever and adapted to engage said shoulder or hook for coupling the operating lever with said hook coupling lever.

6. A door operating device comprising a central coupling lever provided with a shoulder or hook, two side coupling levers arranged on opposite sides of the central lever and each provided with a fork-shaped socket, said coupling levers being operatively connected with the doors to be operated, an operating lever arranged between said side coupling levers and adjacent to the central coupling lever and capable of swinging forward and backward with said levers and to be coupled with either of said side coupling levers by swinging laterally into engagement with the socket of the respective side coupling lever, and a latch mounted on the operating lever and adapted to engage the shoulder or hook of the central coupling lever for connecting the latter with said operating lever.

Witness my hand this 14th day of January, 1913.

CHARLES S. MacKEARNIN.

Witnesses:
 THEO. L. POPP,
 E. M. GRAHAM.